H. H. DOEHLER.
BUSHING AND THE METHOD OR ART OF MAKING SAME.
APPLICATION FILED FEB. 21, 1917.
1,249,920.
Patented Dec. 11, 1917.
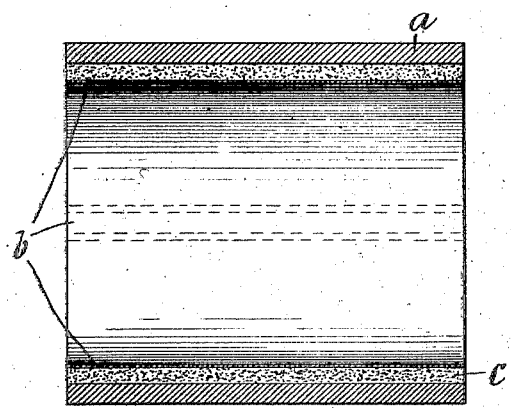
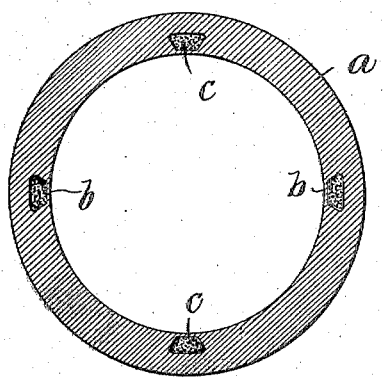
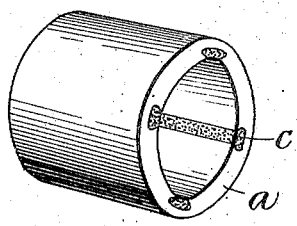
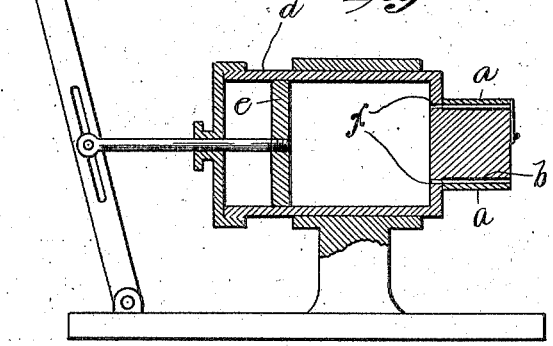
INVENTOR.
ATTORNEY.

UNITED STATES PATENT OFFICE.

HERMAN H. DOEHLER, OF BROOKLYN, NEW YORK.

BUSHING AND THE METHOD OR ART OF MAKING SAME.

1,249,920.

Specification of Letters Patent.

Patented Dec. 11, 1917.

Application filed February 21, 1917. Serial No. 149,977.

*To all whom it may concern:*

Be it known that I, HERMAN H. DOEHLER, a citizen of the United States, residing at the borough of Brooklyn, city of New York, county of Kings, and State of New York, have invented certain new and useful Improvements in Bushings and the Methods or Art of Making Same, of which the following is a specification, reference being had therein to the accompanying drawings, which form a part thereof.

My invention relates to bushings and more particularly to a self lubricating bushing embodying in the construction thereof, a friction or bearing metal shell or body and a lubricating medium forming a portion of and adapted to be applied to the bearing surfaces of said metal by the movement of a shaft mounted in the bushing; and to the method or art of producing such bushings.

A bushing made in accordance with my invention possesses the characteristics that the lubricating medium, such as a graphite paste, may be readily incorporated in the structure of the bushing in a manner to secure a uniform distribution, and density thereof in different portions of the bushing, while being surrounded and protected by the metal portions of the bushing until such time as it is desired to fit same to the shaft to be mounted in the bushing. A further characteristic is that the bushing may be readily machined when fitting it to the shaft, without likelihood of displacing the lubricating medium, or producing a rough surface upon the bearing surfaces of the antifriction metal of the shell or body of the bearing, or breaking down the relatively weak partitions separating the pockets containing said medium.

The pockets for the graphite or other lubricating medium are so arranged that they may be readily and cheaply formed in the shell or body of bearing metal, either by means of cores in casting, or by drilling, the former being preferable as being more economical and as producing greater uniformity in the finished product.

The practice of the method or art of my invention permits the simultaneous filling of all of the pockets with a graphite paste, or other lubricating medium in a manner to insure substantial uniformity in the density of said medium in all of said pockets.

The invention consists primarily in a bushing embodying therein a shell or body having a central bearing opening and a plurality of straight openings extending longitudinally therethrough, said straight openings being adjacent but within the bearing opening of said shell or body, and parallel with each other and with the axis of the said shell or body and a mass of a lubricating medium confined within the said straight openings whereby said bearing opening presents a continuous metallic surface, which surface is adapted to be removed to expose said lubricating medium in fitting the bushing to a shaft; and in such other novel features of construction and combination of parts, and in the novel steps and practices, all as hereinafter set forth and described and more particularly pointed out in the claims hereto appended.

Referring to the drawings,

Figure 1 is a longitudinal section through a bushing embodying my invention;

Fig. 2 is a cross section thereof;

Fig. 3 is a perspective view of said bushing; and

Fig. 4 is a diagrammatic view illustrating the method or art practised in producing the bushing.

Like letters refer to like parts throughout the several views.

In the embodiment of my invention shown in the drawings, a cylindrical shell or body composed of brass, Babbitt or other bearing metal is shown at *a*. The central opening of the shell or body is adapted to receive a shaft, not shown, and the wall *b* about said opening, before a reamer has been used for fitting this opening to a given shaft, is continuous and composed of brass, Babbitt or other bearing metal. Adjacent the wall *b* are a series of substantially straight openings *c* forming pockets for a lubricating medium closed at all points excepting the ends and extending parallel with the axis of said cylindrical shell or body and with each other. These openings *c* are spaced within the wall *b* a distance measured by thousandths of an inch, the metal of said wall being cut away in fitting the bushing to a shaft, so that in use, the bushing will present a series of parallel bearing surfaces composed alternately of a bearing metal, and a body of lubricating medium, the latter being carried upon the former by the movements of the shaft in a manner to afford an adequately lubricated surface throughout the bushing.

By providing substantially straight openings $c$ for the graphite paste, or other lubricating medium, within the wall about the bearing opening of the bushing, I am enabled to load said openings with the graphite paste, or other medium, in a manner to secure substantially uniform density thereof in each of the openings, while at the same time preventing accidental displacement thereof in handling the bushing. Furthermore, by using irregular openings $c$, I am enabled to expose a portion of the body of the graphite, or other lubricating medium, while providing a suitable interlock between said medium and the shell or body of the bushing so that, if desired, the bushing might be reamed to size, prior to its delivery to the consumer. It is preferable, however, to allow the fitting to be done by the consumer.

By making the openings $c$ straight, the formation in the shell or body of the bushing is very simple, as the holes may be formed either by means of cores in casting said body or shell, or said openings may be drilled. Either manner is simple and inexpensive. The arrangement of alternate surfaces of bearing metal and of lubricating material in a completed shell, minimizes any tendency toward the scoring of a shaft therein, although ordinarily the lubrication provided in a bushing of this character, avoids all tendency toward the cutting of a shaft.

Bushings of the character above described, are produced by a method or art which consists in forming a plurality of openings in the shell or body of the bushing, such openings extending parallel to each other and to the axis of the bushing, and in close proximity to the wall of the bearing opening of the bushing. A shell or body so formed is then mounted adjacent a cylinder $d$ having a piston $e$ therein by means of which graphite paste, or other similar lubricating medium is forced through a plurality of ports $f$ coinciding in arrangement and dimensions with the openings $c$ in the shell or body of the bushing. In this manner the graphite paste is forced axially through the openings $c$, the graphite ultimately escaping from the ends of the openings being faced off so as to be flush with the end of the shell or body $a$ and the ends of the body of the graphite toward the cylinder $d$ being faced off by being rubbed across the end of said cylinder. In this manner the complete filling of each of the openings $c$ is insured and since each opening will be filled with the graphite under substantially the same pressure, the density of the graphite in all of said openings will be uniform.

It is possible to load or fill the openings $c$ with the graphite in the manner described solely because such openings are closed at all points excepting at the ends thereof. The method of filling said openings is such as to afford rapidity and economy in the operation.

Ordinarily a bushing made in accordance with my invention, will be delivered with the wall $b$ of the bearing opening, intact, so as to form a barrier of two or three thousandths of an inch, or even more if desired, between the graphite openings and the bearing opening. In fitting to a shaft, the wall $b$ will be reamed away so as to give the proper size to the bearing opening, which will have the incidental effect of removing these barriers, thus exposing graphite through the wall $b$ so as to present to the shaft alternate parallel bearing surfaces of metal and graphite extending parallel with the axis of the bearing as heretofore described.

The exterior of the bushing, while ordinarily cylindrical, may take any desired form.

A bushing made in accordance with my invention, is particularly adapted for the steering columns of automobiles, although its field of utility is not limited to this use. The shell or body $a$ may be made of brass, Babbitt metal, or any other desired metal, having the requisite, anti-friction properties. The said body or shell is preferably made by a finished casting process, the openings $c$ being preferably formed by means of cores, in casting the said shell or body.

It is not my intention to limit the invention to the size, number or dimensions of the openings $c$, shown in the accompanying drawings, or to the particular contour of the shell or body $a$ it being apparent that such may be varied without departing from the spirit and scope of the invention.

Having described the invention, what I claim as new and desire to have protected by Letters Patent is:—

1. A bushing embodying therein a shell or body having a central bearing opening and a plurality of straight openings extending longitudinally therethrough, said straight openings being adjacent the bearing opening of, but within, said shell or body parallel with each other and with the axis of said shell or body, and a mass of a lubricating medium confined within the said straight openings whereby said bearing opening presents a continuous metallic surface, which surface is adapted to be removed in fitting said bushing to a shaft to expose such lubricating medium in fitting said bushing.

2. A bushing embodying therein a shell or body of metal having a central bearing opening and a plurality of straight longitudinally extending openings adjacent said bearing opening, the metal of said shell or body extending across said straight openings forming a barrier between the contents thereof and said bearing opening, and a mass of a lubricating medium in each of said openings and adapted to be exposed within said bearing opening by the removal of said barrier in fitting the bushing to a shaft.

3. A bushing embodying therein a shell or body of metal having a central bearing opening and a plurality of straight longitudinally extending irregular openings adjacent said bearing opening, the metal of said shell or body extending across said straight openings forming a barrier between the contents thereof and said bearing opening, and a mass of a lubricating medium in each of said openings and adapted to be exposed within said bearing opening by the removal of said barrier in fitting the bushing to a shaft.

4. The method or art of making a self lubricating bushing consisting in forming a shell or body of an anti-friction metal having therein a central bearing opening and a plurality of pockets for a lubricating medium, closed at all points excepting at the ends consisting of openings closely adjacent the wall of said bearing opening, and forcing a plastic lubricating medium into and axially of all of said pockets about said bearing opening simultaneously.

In witness whereof, I have hereunto affixed my signature in the presence of two subscribing witnesses, this 15th day of February, 1917.

HERMAN H. DOEHLER.

Witnesses:
ALBERT G. GRUSS,
OTTO A. SCHROEDER.